United States Patent [19]

Kameda

[11] Patent Number: 4,878,399
[45] Date of Patent: Nov. 7, 1989

[54] PLANETARY SUB-TRANSMISSION

[75] Inventor: Osamu Kameda, Hiroshima, Japan

[73] Assignee: Mazda Motor Corporation, Hiroshima, Japan

[21] Appl. No.: 102,217

[22] Filed: Sep. 29, 1987

[30] Foreign Application Priority Data

Oct. 2, 1986 [JP] Japan ............................ 61-151714[U]

[51] Int. Cl.$^4$ ............................................. F16H 37/06
[52] U.S. Cl. ............................ 74/665 T; 74/665 GA; 74/785; 74/740; 180/248; 180/250
[58] Field of Search .................... 74/665 T, 785, 786, 74/787, 740, 674, 701, 665 GA; 180/247, 248, 249, 250

[56] References Cited

U.S. PATENT DOCUMENTS

| | | | |
|---|---|---|---|
| 1,514,872 | 8/1921 | Starr | 74/785 |
| 2,787,919 | 4/1957 | Senkowski et al. | 74/740 |
| 2,971,406 | 2/1961 | Senkowski et al. | 74/785 |
| 4,440,042 | 4/1984 | Holdeman | 74/785 |
| 4,569,252 | 2/1986 | Harper | 74/785 |
| 4,677,873 | 7/1987 | Eastman et al. | 74/740 X |
| 4,677,875 | 7/1987 | Batchelor | 180/248 X |
| 4,690,015 | 9/1987 | Nagano et al. | 74/665 T X |
| 4,760,757 | 8/1988 | Svab | 74/740 X |
| 4,776,444 | 10/1988 | Wörner et al. | 180/249 X |
| 4,788,886 | 12/1988 | Nussbaumer et al. | 180/247 X |

FOREIGN PATENT DOCUMENTS 60-127232  8/1985  Japan .

Primary Examiner—Leslie A. Braun
Assistant Examiner—Christopher Campbell
Attorney, Agent, or Firm—Fleit, Jacobson, Cohn, Price, Holman & Stern

[57] ABSTRACT

A planetary sub-transmission for a vehicle has a planetary gear unit with a carrier member fixedly mounted on an output shaft, a sun gear mounted on the output shaft for rotation, and a ring gear fixedly supported by the sub-transmission case. A remotely operable shift member supported by an input shaft for axial movement selectively couples the input shaft to the output shaft, either directly or through the sun gear of the planetary unit, to shift the sub-transmission between high speed and low speed drive ranges.

2 Claims, 3 Drawing Sheets

PLANETARY SUB-TRANSMISSION

BACKGROUND OF THE INVENTION

The present invention relates to a sub-transmission for a vehicle, and more particularly to a planetary sub-transmission capable of shifting between high and low speed drive ranges by means of a planetary gear disposed between an input and an output shaft.

Various types of planetary secondary- or sub-transmissions are known in the art. One such planetary sub-transmission is disclosed, for example, in Japanese Utility Model Unexamined Publication No. 60-127,232 entitled "Power Transfer Apparatus for a Vehicle", laid open to the public Aug. 27, 1985, the disclosure of which is hereby incorporated by reference. In this planetary sub-transmission, shifting between drive ranges is effected by coupling coaxially disposed input and output shafts either directly or through a planetary gear unit having a sun gear and a ring gear, the sun gear and ring gear being fixed to the input shaft and to a transfer case, respectively. In this apparatus, the input and output shafts are coupled to each other directly for a high speed drive range, or indirectly, namely through the planetary gear unit, for a low speed drive range. For changing as between the direct and indirect coupling of the input and output shafts, a shifting means is operated to bring an input pinion gear of the output shaft selectively into engagement with an output pinion gear of the input shaft, or a carrier member of the planetary gear unit.

When direct coupling is established between the input and output shafts by means of the pinion gears fixedly mounted on the input and output shafts, the carrier member of the planetary gear unit is disengaged from the pinion gear on the output shaft and caused to idle or race. Such idling of the carrier member, arranged around the sun gear, and generally having a large moment of rotational inertia, tends to cause a large loss of driving torque between the input and output shafts particularly during high speed driving.

OBJECT OF THE INVENTION

It is an object of the present invention to provide an improved planetary sub-transmission in which loss of driving torque is minimized when input and output shafts of the sub-transmission are directly coupled.

SUMMARY OF THE INVENTION

According to the present invention, the planetary sub-transmission comprises an input shaft and an output shaft arranged coaxially, and a planetary gear unit with a carrier member fixedly mounted on the output shaft and a sun gear supported by the output shaft for rotation. The input and output shafts are placed in operational coupling with each other through the sun gear or through the carrier member, by means of a shift member slidably fitted to the input shaft so as to shift the sub-transmission selectively as between three drive conditions, namely a high speed drive range, a low speed drive range, and a neutral condition. When the input and output shafts are directly coupled, the sun gear idles, and since this has a relatively low moment of inertia (compared, for example with the carrier,) loss of driving torque which may be induced between the input and output shafts is considerably reduced.

When it is required to shift the sub-transmission into a low speed drive range, the shift member is brought into engagement with the sun gear of the planetary gear unit, thereby indirectly coupling the input shaft to the output shaft. Under this indirect coupling between the input and output shafts, driving power is transmitted from the input shaft to the output shaft through the sun gear, pinion gears held by the carrier member in mesh with the sun gear, and the carrier member, in this order. Through this transmitting system, strong driving power is transmitted between the input and output shafts.

On the other hand, in order to transmit driving power directly from the input shaft to the output shaft, the shift member is reversely operated so as to be disengaged from the sun gear and brought into engagement with the carrier member, so as to establish a direct coupling between the input and output shafts thereby shifting the planetary sub-transmission into the high speed drive range.

In the planetary sub-transmission of the present invention, since the sun gear idles about the output shaft when direct coupling is established between the input and output shafts, and since the sun gear has a smaller moment of inertia than the carrier member, the driving power transmission efficiency is largely improved in comparison with prior planetary sub-transmissions wherein the carrier member of a planetary gear unit idles when the input and output shafts are directly coupled.

In a preferred embodiment of the sub-transmission of the present invention, because the carrier member of the planetary gear unit is fixedly attached to the output shaft, and is thereby capable of forming a driving torque output element both in the high speed drive range and in the low speed drive range, the sub-transmission can be simplified in mechanical construction. For example, in prior sub-transmissions, a thrust bearing, apart from bearings for supporting the input and output shafts, must be provided to support the carrier member against thrust from the ring gear and the sun gear of the planetary gear unit. In this invention, however, because of the carrier member being fixed to the output shaft, a single bearing can be used both to support the carrier member against axial thrust and also for supporting the output shaft, so that no special bearing is needed for the carrier member of the planetary gear unit.

According to another preferred feature of the invention, the shift member is located forwardly of the planetary gear unit, and substantially the same force is exerted on the shift member both in the high and low-speed drive ranges. Therefore, no specially strengthened coupling construction is required for the low speed drive range and, furthermore, the axial length of the sub-transmission can be reduced. Moreover, the forward location of the shift member is advantageous in applications wherein an ovoid form of sub-transmission case, which is well known to those skilled in the art to be mechanically strong against deformation under thrust load, is required to provide a reinforced connection between the sub-transmission case and a main-transmission case in order to improve the rigidity of a whole transmission case assembly against vibrations. The ovoid form of sub-transmission case makes it possible to provide the sub-transmission case with a double walled connection portion adjacent to the main-transmission case without increasing the maximum diameter and the overall length thereof.

These together with other objects and advantages which will become subsequently apparent reside in the

BRIEF DESCRIPTION OF THE DRAWING FIGURES

DETAILED DESCRIPTION OF THE INVENTION

A planetary sub-transmission according to a preferred embodiment of the present invention incorporates various elements, in particular a main-transmission, a power transfer and so forth, similar to those of conventional power trains. Because such elements are well known to those skilled in the art, this description will be directed in particular to elements forming part of, or cooperating directly with the planetary sub-transmission embodying the present invention. It is to be understood that planetary sub-transmission elements not specifically shown or described herein may be selected from those known in the art.

It should be noted that the words "front" and "rear" in this specification indicate directions toward top and end sides of a vehicle, respectively.

Figure 1:
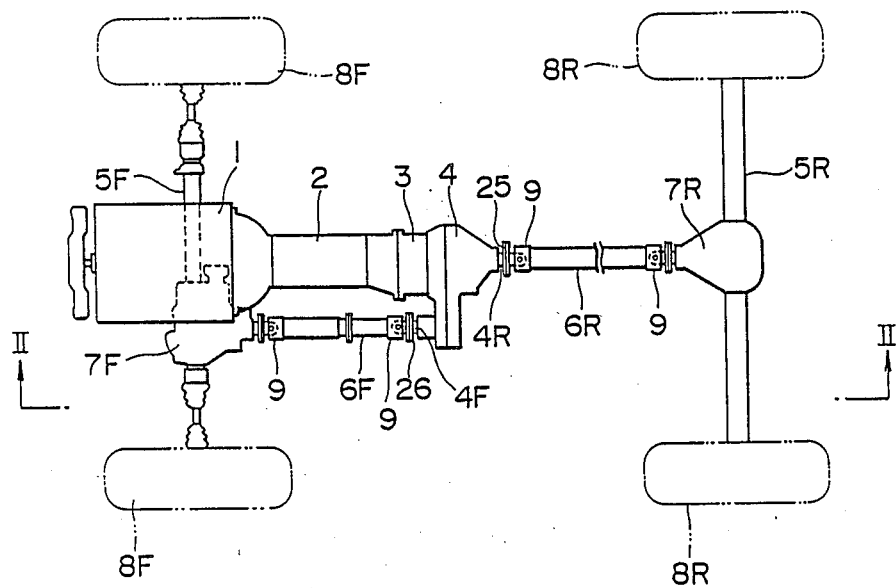
FIG. 1 is a schematic plan view showing a power plant for a four wheel drive vehicle embodying the present invention.
Figure 2:
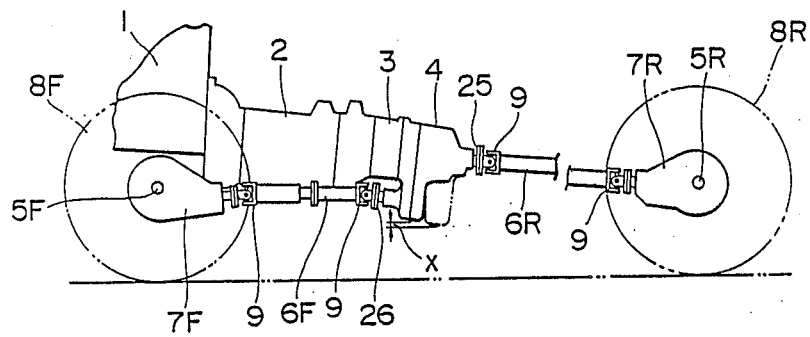
FIG. 2 is a schematic elevational view of the power plant taken along a line II—II of FIG. 1.

Referring now to the drawings, there is shown in FIGS. 1 and 2 a power train for a four wheel drive vehicle having an engine unit 1, a primary- or main-transmission assembly 2, a secondary- or sub-transmission assembly 3, and a power transfer assembly 4 arranged in order from the front side of the vehicle. A first or rear output shaft 4R of the power transfer assembly 4 is connected to a rear drive shaft 5R through a rear propeller shaft 6R and a rear differential gear 7R by which a pair of rear wheels 8R are driven. A second or front output shaft 4F of the power transfer assembly 4 which is laterally spaced from and located in parallel with the rear output shaft 4R, is connected to a front drive shaft 5F through a front propeller shaft 6F and a front differential gear 7F, by which a pair of front wheels 8F are driven. As is generally well known to those skilled in the art, each propeller shaft 6R, 6F at both ends is flexibly connected to the output shaft 4R, 4F and the differential gear 7R, 7F by means of universal joints 9.

As is clearly seen in FIG. 2, the power train in this embodiment is installed on the vehicle with the center lines of the front and rear output shafts 4F and 4R inclined downwardly towards the rear. This inclined arrangement of the power train in advantageous in cases where the power transfer assembly 4 including its chain case is required to have an increased bottom height, if a low road clearance is permissible, the power train can be located lower down.

Figure 3:
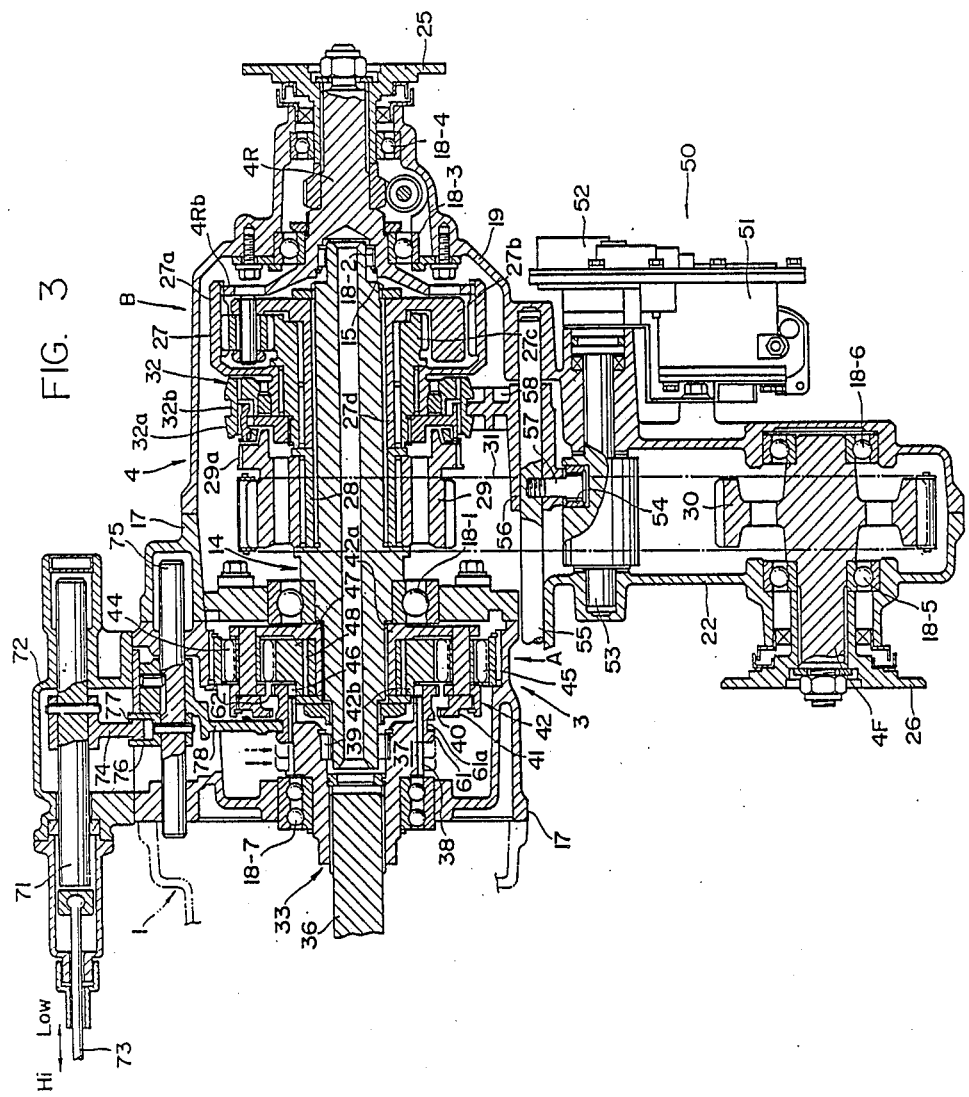
FIG. 3 is an enlarged sectional elevational view of a preferred embodiment planetary sub-transmission in accordance with the present invention.

Reference is now made to FIG. 3 showing the sub-transmission assembly 3 and the power transfer assembly 4 in longitudinal section. The power transfer assembly 4 has three rotatable shafts, namely a transfer input shaft 14 which in turn serves as an output shaft of the sub-transmission assembly 3; the rear output shaft 4R located coaxially relative to the transfer input shaft 14; and the front output shaft 4F laterally spaced from and located in parallel to the transfer input shaft 14. The transfer input shaft 14 is rotatably supported at its respective ends by a first bearing 18-1 fixed within a sub-transmission case 17 and a second needle roller bearing 18-2 fixedly mounted in a recess or blind bore 15 formed in the front end of the rear output shaft 4R. Due to the provision of the second needle roller bearing 18-2, the transfer input shaft 14 is coupled to and rotatable relative to the rear output shaft 4R. The rear output shaft 4R is rotatably supported at its respective ends by third and fourth bearings 18-3 and 18-4 which are both fixed in a power transfer case 19. Provided at the end of the rear output shaft 4R extending rearwardly out of the power transfer case 19 is a flange coupling 25 by which the rear output shaft 4R is operationally connected to the rear wheels 8R through the rear propeller shaft 6R, the rear differential gear 7R and the rear driving shaft 5R as is previously described and shown in FIGS. 1 and 2.

The front output shaft 4F is partially located within a chain case 22 which is defined by casing halves extending downwardly from the sub-transmission case 17 and the power transfer case 19. Shaft 4F is rotatably supported by the fifth and sixth bearings 18-5 and 18-6 fixed within the chain case 22. The front output shaft 4F extending forwardly out of the chain case 22 is provided with a flange coupling 26 at its front end by which the front output shaft 4F is operationally connected to the front wheels 8F through the front propeller shaft 6F, the front differential gear 7F and the front driving shaft 5F as previously described and shown in FIGS. 1 and 2.

Mounted on a rear portion of the transfer input shaft 14 is a center differential 27 forming part of a planetary gear unit B. A ring gear 27a is provided internally of differential 27 and is in meshed engagement with a flange-shaped gear 4Rb formed integrally with the rear output shaft 4R. A carrier member 27b is fixedly mounted on the transfer input shaft 14 and a sun gear 27c is externally mounted for rotation about the transfer input shaft 14 on a forwardly extending sleeve portion 27d of the carrier member 27b. Adjacent to the first bearing 18-1, and rotatably mounted on the transfer input shaft 14 through a bearing sleeve 28 is a driving chain sprocket wheel 29 having a splined hub 29a formed integrally therewith. Wheel 29 is connected to a driven chain sprocket wheel 30 formed integrally with the front output shaft 4F by means of a chain 31 (shown by a double dotted line in FIG. 3). Between the driving chain sprocket wheel 29 and the center differential 27 is a shift means 32 including an internally splined annular sleeve member 32a which is axially moved selectively to bring the sun gear 27c of the planetary gear unit B into engagement with the ring gear 27a or the driving chain sprocket wheel 29, so as to shift the power transfer assembly 4 between three different drive conditions, namely a two wheel drive condition wherein the rear wheels 8R are driven, a differential-locked drive condition wherein both the front and rear wheels 8F and 8R are driven with locking of the center differential 27, and a four wheel drive condition wherein both the front and rear wheels 8F and 8R are differentially driven according to friction forces exerted on the respective wheels 8F and 8R.

For shifting the power transfer assembly 4 between the three different drive conditions by means of the shift means 32, there is provided an actuator 50 including a high power electric motor 51 and a reduction gear 52 which cooperates with a shift control rod 53 having a cam groove 54 formed on its outer periphery. Placed in juxtaposition with the shift control rod 53 is a guide rod 55 on which a sleeve member 56 is fixedly mounted. The sleeve member 56 is provided with a connecting pin 57 with which the cam groove 54 of the shift control rod 53 is slidably engaged and a fork member 58, the pin 57 and member 58 being axially spaced from and extending radially oppositely to each other. The fork member 58 is in circumferential slidable engagement with an annular groove 32b formed on a periphery of the sleeve member 32a of the shift means 32.

When the electric motor 51 is actuated to rotate the shift control rod 53 through the reduction gear 52, the sleeve member 56 fixed to the guide rod 55 is axially displaced through the slidable engagement between the connecting pin 57 and the cam groove 54 so as to axially displace the internally splined annular sleeve member 32a of the shift means 32, selectively coupling the sun gear 27c of the planetary gear unit B to the ring gear 27a of the planetary gear unit B or to the splined hub 29a of the driving chain sprocket wheel 29 according to the directions of axial displacement of the sleeve member 32a of the shift means 32. When the sleeve member 32a of the shift means 32 is displaced rearwardly and brought into splined engagement with the sun gear 27c of the planetary gear B, the transfer assembly 4 is shifted into two wheel drive condition. On the other hand, when the sleeve member 32a of the shift member 32 is displaced forwardly and brought into splined engagement with the splined hub 29a of the driving chain sprocket wheel 29, the transfer assembly 4 is shifted into four wheel drive condition.

The sub-transmission assembly 3 includes as an input shaft means thereof an output shaft 36 of the main-transmission assembly 2 and an externally splined input shaft member 33 spline-coupled to the output shaft 36 of the main-transmission assembly 2. The externally splined input shaft member 33 which has a center-bored enlarged external diameter portion 37 with external splines 38 formed on its outer periphery, is supported externally by a seventh bearing 18-7 fixedly supported in a sub-transmission case 17, and shaft member 33 is supported internally by a needle roller bearing 39 mounted on the forward end portion of the transfer input shaft 14. The sub-transmission assembly 3 also includes as an output shaft the transfer input shaft 14 of the transfer assembly 4 which is partly located within and coaxially disposed relative to the center bore formed in the enlarged external diameter portion 37 of the input shaft member 33. The needle roller bearing 39 rotatably supporting the forward end portion of the transfer input shaft 14, allows relative rotation between the input and output shafts 33 and 14 of the sub-transmission assembly 3.

The forward portion of the transfer input shaft 14 is provided with a planetary gear unit A comprising a sun gear 47, ring gear 45, a carrier member 42 bearing a plurality of pinions 44 in external engagement with the sun gear 47 and in internal engagement with the ring gear 45. The carrier member 42 has an axially forwardly extending, integrally formed sleeve-like hub member 42a which is fixedly mounted on the transfer input shaft 14 by means of splines and which, on the other hand, supports the sun gear 47 for rotation through a needle roller bearing 48. The rear end of the sleeve-like hub member 42a of the carrier member 42 is axially supported by an inner race of the first bearing 18-1 which supports the transfer input shaft 14. The first bearing 18-1, supports the carrier member 42, and hence the planetary gear unit A against thrust exerted thereon. The common use of the first bearing 18-1 in supporting the planetary gear unit A and the transfer input shaft 14 is contributive to decreasing the size of the transmission assembly 3. The ring gear 45 of the planetary gear unit A is fixedly supported inside the sub-transmission case 17. The sun gear 47 is integrally formed with a decreased diameter of front boss 42b having an outer periphery provided with external splines 46 aligned with and complimentary to the splines 38 formed on the periphery of the enlarged diameter portion 37 of the sub-transmission input shaft member 33. Fixedly attached to the carrier member 42 on its front side is an annular ring member 41 formed with internal splines 40.

An internally splined sleeve member 61 defining a transmission shift means, is in splined engagement with the externally splined enlarged diameter portion 37 of the sub-transmission input shaft member 33, and has a radially outwardly extending flange with external splines 62 which is internally engageable with the internal splines 40 of the annular ring member 41 of the carrier member 42. The sleeve member 61 is provided with an external annular groove 61a formed on the periphery thereof which is engaged by a shift fork 78 described in detail below.

When the sleeve member 61 of the transmission shift means is moved axially forwardly, the externally splined sleeve member 61 is brought into splined engagement with the internally splined annular ring member 41 fixedly attached to the carrier member 42, thereby coupling the sub-transmission input shaft member 33 to the carrier member 42 of the planetary gear unit A. Hence, the input shaft member is operative connected directly to the transfer input shaft 14, so as to transmit power directly to the transfer input shaft 14 from the sub-transmission input shaft member 33. In this way, the sub-transmission is shifted into a high speed drive range. On the other hand, when the externally splined sleeve member 61 is moved axially rearwardly, the externally splined sleeve member 61 is then brought into splined engagement with the externally splined sun gear 47 of the planetary gear unit A and is disengaged from the internally splined annular ring member 41 fixed to the carrier member 42, thereby coupling the sub-transmission input shaft member 33 to the transfer input shaft 14 through the sun gear 47 of the planetary gear unit A, so as to transmit driving power to the transfer input shaft 14 from the transmission input shaft member 33 not directly, but through the sun gear 47, the pinion gears 44, and the carrier member 42. Thus the sub-transmission 3 is shifted into a low speed drive range.

For effecting the above-described drive range shifting of the sub-transmission assembly 3, there may be a shift lever such as a column shift lever provided on a steering column or a floor shift lever (not shown) operative from a driver's compartment of the vehicle and which may have, as is well known, three operating positions, namely a low speed drive range selecting position, a high speed drive range selecting position, and a neutral range selecting position. A wire 73 connects the shift lever to a shift control rod 71 which is supported within an extended portion 72 of the sub-transmission case 17 for axial movement. Fixedly mounted on the shift control rod 71 is a connecting pin 74 extending downwardly.

Disposed in juxtaposition with the shift control rod 71 is a supporting rod 75 supported in the extended portion 72 of the sub-transmission case 17 for axial movement. The supporting rod 75 carries an annular sleeve member 76 which is partially formed with an annular groove 77 engaged by the connecting pin 74 of the shift control rod 71 and which has a shift fork 78 extending radially downwardly. As previously described, the shift fork 78 of the sleeve member 76 is in circumferential slidable engagement with the annular groove 61a of the sleeve member 61.

When the shift lever in the driver's compartment is manipulated and moved to its high speed drive range selecting position, the shift control rod 71 is displaced axially forwardly to move the sleeve member 61 forwardly in position, so as to place the sub-transmission input shaft member 33 and the carrier member 42 of the planetary gear unit A in splined engagement, thereby shifting the sub-transmission 3 to the high speed drive range. On the other hand, when the shift lever in the driver's compartment is operated or reversed from its low speed drive range selecting position, the shift control rod 71 is displaced axially rearwardly to move the sleeve member 61 rearwardly in position so as to uncouple the sub-transmission input shaft member 33 from the carrier member 42 and to place the sub-transmission input shaft member 3 and the sun gear 47 of the planetary unit A in splined engagement, thereby shifting the sub-transmission 3 into a low speed drive range. When the column shift lever is maintained at its neutral range selecting position, the shift control rod 71 is placed to locate the sleeve member 61 at a position wherein neither the carrier member 42 nor the sun gear 47 of the planetary gear A is operationally coupled to the sub-transmission input shaft member 33, thereby shifting the sub-transmission 3 into a neutral drive range.

In operation of the planetary sub-transmission of the preferred embodiment according to the present invention constructed as described above, the shift lever is manipulated by the drive in the driver's compartment to shift the sub-transmission into a desired drive condition. When the shift lever is manipulated to select the low speed drive range, the shift control rod 71 is axially moved rearwardly or to the right side viewed in FIG. 3. Consequently, the shift fork 78 of the annular sleeve member 76 supported by the supporting rod 75, which is connected to the connecting pin 74 of the shift control rod 71, is axially displaced to the right so as to place the sleeve member 61 mounted on the input shaft member 33 into external splined engagement with the sun gear 47 of the planetary gear unit A, operationally coupling the input shaft member 33 to the sun gear 47 of the planetary gear unit A, and hence to the transfer input shaft 14, while disengaging sleeve member 61 from the carrier member 42 of the planetary gear A. As a result, driving power is transmitted from the input shaft member 33 of the sub-transmission assembly 3 to the transfer input shaft 14 of the transfer assembly 4 not directly, but through the sun gear 47, the pinion gears 44, and the carrier member 42 which is fixed to the transfer input shaft 14. Due to this power transmission via the planetary gear unit A, the sub-transmission assembly 3 is shifted into the low speed drive range.

On the other hand, when the column shift lever is manipulated by the driver to select the high speed drive range, the shift control rod 71, and hence the supporting rod 75, is axially displaced to the left viewed in FIG. 3. Consequently, the shift fork 78 moves the sleeve member 61 from the illustrated position to a position shown by the solid vertical arrow in FIG. 3, bringing it into internally splined engagement with the carrier member 42 of the planetary gear unit A. As a result, the input shaft member 33 is coupled to the carrier member 42, and hence to the transfer input shaft 14 of the transfer assembly 4, while the input shaft member 33 is uncoupled from the sun gear 47 of the planetary gear A. Therefore, driving power is transmitted directly to the transfer input shaft 14 of the transfer assembly 4 via the carrier member 42 of the planetary gear A. In such a way, the input shaft member 33 and the transfer input shaft 14, as the input and output shafts of the sub-transmission assembly 3, are directly coupled to each other. Due to this direct power transmission from the input shaft member 33 to the transfer input shaft 14, the sub-transmission assembly 3 is shifted into the high speed drive range.

When the sub-transmission assembly 3 is in the high speed drive range, the sun gear 47 of the planetary gear unit A, which has been disengaged from the sleeve member 61, will idle around the transfer input shaft 14. Accordingly, in comparison with conventional sub-transmissions in which the carrier of a planetary gear idles or races when an input and an output shaft of the sub-transmission are directly coupled, any loss of transmitted driving power between the input and output shafts 33 and 14 of the sub-transmission 3 of this invention, is quite small since the sun gear 47 generally has a rotational moment of inertia smaller than the carrier member 42 of the planetary gear unit A.

When the column shift lever is manipulated by the driver to select the neutral drive range, the shift control rod 71, and hence the supporting rod 75, is placed in its central operating position. Consequently, the shift fork 78 of the sleeve member 76 places the sleeve member 61 and its central position shown by a dotted arrow in FIG. 3, so as to disengage the sleeve member 61 both from the carrier member 42 and from the sun gear 47, maintaining the input and output shafts of the sub-transmission assembly 3 operationally uncoupled or in neutral so that no power is transmitted between the input shaft member 33 and the transfer input shaft 14. In this way, the sub-transmission assembly 3 is shifted in to the neutral drive range.

Figure 4:
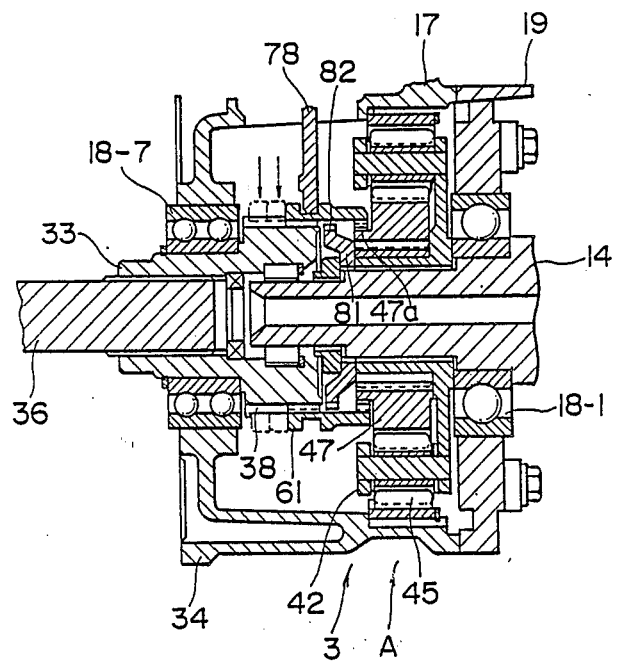
FIG. 4 is a sectional elevational view of a part of the planetary sub-transmission shown in FIG. 3 incorporating a modification.

FIG. 4 shows another preferred embodiment of the planetary sub-transmission according to the present invention in which the splined engagement mechanism between the input shaft member 33 and the transfer input shaft 14 is replaced by an externally splined annular coupling ring 81 which is fixed to the transfer input shaft 14 by means of splines. External splines 82 of the annular coupling ring 81 are aligned with and axially spaced from the splines 46 of the front boss 42a of the sun gear 47 of the planetary gear unit A.

The planetary sub-transmission of the embodiment shown in FIG. 4 can be operated in the same manner as that shown in FIG. 3. Specifically, when the shift lever in the driver's compartment is manipulated and moved to the low speed drive range selecting position, the sleeve member 61 is brought into splined engagement with the front boss 42b of the sun gear 47 of the planetary gear unit A, so as to couple the input shaft member 33 to the transfer input shaft 14 of the transfer assembly 4 not directly but through the sun gear 47, the pinion gears 44, and the carrier member 42 which is fixed to the transfer input member 14 by means of splines. On the other hand, when the shift lever in the driver's compartment is manipulated and moved to the high speed drive range selecting position, the sleeve member 61 is disengaged from the front boss 42b of the sun gear 47 and is brought into splined engagement with the annular coupling ring 81 of the transfer input shaft 14, thereby coupling the input shaft member 33 of the sub-transmission assembly 3 directly to the transfer input shaft 14 of the transfer assembly 4. If the shift lever is maintained at the neutral range selecting position, the sleeve member 61 is placed between the front hub 42b of the sun gear 47 of the planetary gear unit A and the annular coupling ring 81 of the transfer input shaft 14 so as to uncouple the input shaft member 33 of the sub-transmission assembly 3 from the transfer input shaft 14 of the transfer assembly 4, whereby no power is transmitted therebetween.

Although the present invention has been described in detail by way of preferred embodiment thereof with reference to the accompanying drawings, it is to be noted that various changes and modifications will be apparent to those skilled in the art. Therefore, unless otherwise such changes and modifications depart from the scope of the present invention, they should be construed as included therein.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A planetary sub-transmission for a vehicle comprising:
    an input shaft and an output shaft, said shafts being axially spaced from and located coaxially relative to each other in a sub-transmission case;
    a planetary gear unit having a carrier member fixedly mounted on said output shaft, a ring gear fixedly supported in said sub-transmission case, and a sun gear supported for rotation on said carrier member;
    shift means mounted on said input shaft for axial movement between respective positions selectively coupling said input shaft to said sun gear and to said carrier member respectively so as to shift said sub-transmission between a high speed drive range and a low speed drive range; and
    means for effecting said axial movement of said shift means,
    said carrier member having a sleeve-like member integrally formed therewith and through which the carrier member is fixedly mounted on said output shaft,
    said output shaft being received in said sleeve-like member and coupled to said sleeve-like member by splines, the planetary sub-transmission further comprising a bearing through which said sun gear is mounted on said sleeve-like member.

2. A planetary sub-transmission for a vehicle comprising:
    an input shaft and an output shaft, said shafts being axially spaced from and located coaxially relative to each other in a sub-transmission case;
    a planetary gear unit having a carrier member fixedly mounted on said output shaft, a ring gear fixedly supported in said sub-transmission case, and a un gear supported for rotation on said carrier member;
    shift means mounted on said input shaft for axial movement between respective positions selectively coupling said input shaft to said sun gear and to said carrier member respectively so as to shift said sub-transmission between a high speed drive range and a low speed drive range; and
    means for effecting said axial movement of said shift means,
    said carrier member having a sleeve-like member integrally fored therewith through which said carrier member is mounted on said output shaft through splines provided on a radially inner surface thereof and which mounts said sun gear thereon through a needle roller bearing, said sleeve-like member and sun gear being concentrically located around said output shaft.

* * * * *